United States Patent
Bhate et al.

(10) Patent No.: US 11,582,128 B1
(45) Date of Patent: Feb. 14, 2023

(54) SYSTEM, DEVICE, AND METHOD OF MEASURING DIRECTIONAL LATENCY AND CONGESTION IN A COMMUNICATION NETWORK

(71) Applicant: ALLOT LTD., Hod HaSharon (IL)

(72) Inventors: Mitesh Bhate, Mumbai (IN); Yaron Yossef Soffer, Ness Ziona (IL)

(73) Assignee: ALLOT LTD., Hod Hasharon (IL)

( * ) Notice: Subject to any disclaimer, the term of this patent is extended or adjusted under 35 U.S.C. 154(b) by 0 days.

(21) Appl. No.: 17/400,112

(22) Filed: Aug. 12, 2021

(51) Int. Cl.
| | |
|---|---|
| *H04L 43/0864* | (2022.01) |
| *H04L 43/028* | (2022.01) |
| *H04L 47/12* | (2022.01) |
| *H04L 47/193* | (2022.01) |
| *H04L 69/22* | (2022.01) |
| *H04L 47/283* | (2022.01) |

(52) U.S. Cl.
CPC ........ *H04L 43/0864* (2013.01); *H04L 43/028* (2013.01); *H04L 47/12* (2013.01); *H04L 47/193* (2013.01); *H04L 47/283* (2013.01); *H04L 69/22* (2013.01)

(58) Field of Classification Search
CPC ... H04L 43/0864; H04L 43/028; H04L 47/12; H04L 47/193; H04L 47/283; H04L 69/22
See application file for complete search history.

(56) References Cited

U.S. PATENT DOCUMENTS

| | | | |
|---|---|---|---|
| 9,787,461 B1 | 10/2017 | Zigelboim et al. | |
| 10,396,971 B2 | 8/2019 | Zigelboim et al. | |
| 11,411,840 B2* | 8/2022 | Cioffi | H04L 41/5019 |
| 2002/0177910 A1* | 11/2002 | Quarterman | H04L 45/00 700/28 |
| 2017/0280474 A1* | 9/2017 | Vesterinen | H04L 41/50 |
| 2019/0312815 A1* | 10/2019 | Altman | H04W 28/0231 |
| 2020/0366608 A1* | 11/2020 | Pan | H04L 47/127 |
| 2021/0152484 A1* | 5/2021 | Shpigelman | H04L 47/263 |
| 2021/0250268 A1* | 8/2021 | Natarajan | H04W 76/10 |

* cited by examiner

*Primary Examiner* — Patrice L Winder
*Assistant Examiner* — Angela M Widhalm De Rodriguez
(74) *Attorney, Agent, or Firm* — Browdy and Neimark, PLLC

(57) ABSTRACT

Systems, devices, and methods of measuring directional latency and congestion in a communication network. A Uni-Directional Latency Determination Unit is connected in a communication network, located between an end-user device and a server. It monitors packets transported between the end-user device and the server, and it estimates a uni-directional latency of packet transport from the end-user device to the server or from the server to the end-user device. It utilizes a Transmission Control Protocol (TCP) Header and Timestamp Analyzer, to perform an analysis of data contained in timestamps of TCP packet headers of transported packets; and particularly, it analyzes data contained in a TSval field of such TCP packet headers. Congestion mitigation operations are accordingly deployed or activated.

18 Claims, 4 Drawing Sheets

US 11,582,128 B1

SYSTEM, DEVICE, AND METHOD OF MEASURING DIRECTIONAL LATENCY AND CONGESTION IN A COMMUNICATION NETWORK

FIELD

Some embodiments are related to the field of communication networks.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

SUMMARY

Some embodiments provide systems, devices, and methods for measuring or determining or estimating latency, and particularly directional latency or uni-directional latency, as well as network congestion level or network congestion status (or, detecting existence or non-existence of network congestion) in a communication network.

For example, a Uni-Directional Latency Determination Unit is connected in a communication network, located between an end-user device and a server. It monitors packets transported between the end-user device and the server, and it estimates a uni-directional latency of packet transport from the end-user device to the server or from the server to the end-user device. It utilizes a Transmission Control Protocol (TCP) Header and Timestamp Analyzer, to perform an analysis of data contained in timestamps of TCP packet headers of transported packets; and particularly, it analyzes data contained in a TSval field of such TCP packet headers. Congestion mitigation operations are accordingly deployed or activated. Some embodiments may be used in conjunction with non-TCP packets; for example, in systems that store a packet's timestamp in the packet header or in another field or portion of the packet; or in future versions or evolutions of TCP or such other packet-timestamping protocols.

Some embodiments may provide other and/or additional advantages and/or benefits.

DETAILED DESCRIPTION OF SOME DEMONSTRATIVE EMBODIMENTS

Figure 1:
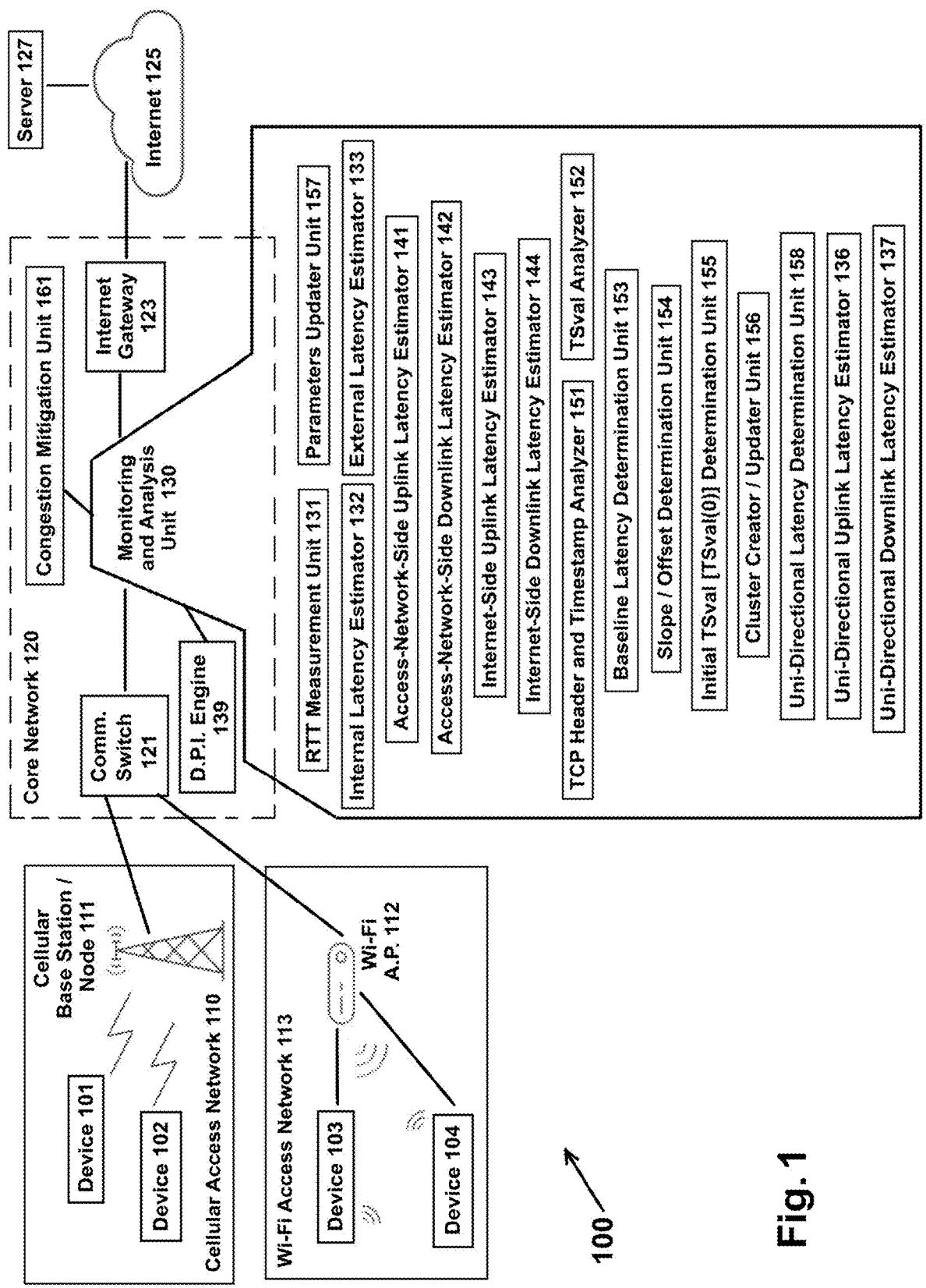
FIG. 1 is a schematic block diagram illustration of a system, in accordance with some demonstrative embodiments.

The Applicants have realized that communication network provide a variety of applications that may utilize, or may require, real-time or near-real-time communications; for example, voice calling, video calling, video conferencing, real-time gaming, live video streaming, live audio streaming, or the like.

The Applicants have realized that one of the challenges for communication service providers (e.g., Internet Service Provider (ISP), Cellular Service Provider, or the like) is to monitor and provide the best possible Quality of Experience (QoE) for users.

The Applicants have realized that an important step towards improving or enhancing the QoE of users, is to correctly measure or determine the values of particular Key Performance Indicator (KPI) parameters, and to monitor the relevant KPI parameters, as a means for monitoring and also improving the QoE.

The Applicants have realized that a relevant KPI for providing high QoE to users is the latency of the communication network, or the latency that a particular user (or a particular group of users) is experiencing.

In accordance with some embodiments, a communication network comprises multiple network elements or network nodes; each such network element has its own resource constraints or operational limitations. The Applicants have realized that the quality of communication between two end-points is affected by the performance of each one of those network elements. For example, realized the Applicants, a particular network element may have a fixed capacity, but may face a higher demand than what it can transmit, constrained by its own resources and/or by the communication link capacity; and such situation may cause delays in the transmission of packets, and/or may cause buffering or holding the packets for a short time (or sometimes, for a long time) without transmitting such waiting packets. The relevant buffer(s) may build up, leading to increased buffer delay or buffer-related delays, and causing the latency or the average latency to increase. For example, in cellular network, a particular cell of the network may introduce additional latencies to communications that pass through it, due to increased buffering of the data that occurs when the traffic rate reaches (or surpasses) hits the peak performance capacity of that particular network cell.

In accordance with some embodiments, Latency is the delay (e.g., the time-delay) for data to arrive from a source point to a destination point; or vice versa. Some conventional systems attempt to measure bi-directional latency or the overall roundtrip latency, which is the time that it takes end-point A to send a short signal to end-point B and to receive back an acknowledgment indication from end-point B. For example, some websites allow an end-user device to measure a roundtrip or bi-directional "ping" time. In contrast, some embodiments of the present invention may uniquely define, measure and monitor Uni-Directional Latency, for example, with separation between Uplink Latency and Downlink Latency.

For example, a conventional system may, at most, indicate that a particular end-user device currently has a Roundtrip Latency or an Overall Latency or a Bi-Directional Latency of 80 milliseconds. In contrast, some embodiments of the present invention may measure and may determine that this end-user device has an Uplink Latency (namely, the uni-directional latency in the direction from the client device to the server) of 15 milliseconds, and has a Downlink Latency (namely, the uni-directional latency in the direction from the server to the client device) of 65 seconds. Such high-granularity data about the values of each Uni-Directional Latency parameter (uplink latency, and downlink latency) may then be utilized by the communication system in order to reduce or mitigate network congestion. In the above example, additional resources may be selectively allocated or freed for utilization in the Downlink direction, which has a greater uni-directional latency relative to the Uplink latency.

In some embodiments, Latency indicates bi-directional latency, which is the overall latency or the roundtrip latency; which in turn may be divided or separated into Downlink Latency and Uplink Latency. For example, Downlink Latency may indicate the time-delay for data to arrive from an Internet entry/exit node (or to a latency monitoring unit) to a particular endpoint (e.g., a particular end-user device or User Equipment (UE); or a particular Internet server); whereas, Uplink Latency may indicate the time-delay for data to arrive from the endpoint (e.g., the end-user device or UE, or the Internet server) to the Internet entry/exit node (or to a latency monitoring unit).

The Applicants have realized that Latency and/or Uplink Latency and/or Downlink Latency may have a significant impact on the QoE of various real-time applications (e.g., video conferencing, real-time gaming, live streaming, or the like); and that such latency, and particularly the uni-directional latency, should be monitored and tracked in order to assist in reducing latency and mitigating network congestion and in order to improve QoE; and/or in order to enable other network elements to improve the QoE by identifying the particular network element that causes the latency and by activating one or more latency-reducing operations or congestion-mitigating operations.

Some embodiments provide a mechanism to measure or estimate or determine directional latency (or uni-directional latency), for example, between the monitoring network element (or network node) and an end-user device (or UE), and to generate insights and KPI values regarding network congestion and QoE in the network. Some embodiments provide a method and a system that is agnostic to the particular access network being used, and can be deployed in any relevant Internet Protocol (IP) network, Internet communication network, cellular communication network, or the like.

Some embodiments provide a system and a method for measuring uni-directional latency or single-direction latency (e.g., uplink latency, and separately, downlink latency) in a communication network, in real-time or in near-real-time, between (I) an inline network element and/or a TAP (Test Access Point) network element and/or a traffic-mirroring interface or network element, or mirror interface) network element, and (II) one or more particular end-user devices or UEs or end-points of the communication network. Some embodiments may perform such measurement by inspecting and analyzing data related to Transmission Control Protocol (TCP) flows from (and/or to) such end-user devices or UEs or end-points.

Furthermore, some embodiments may perform measurement or estimation of network congestion state or network congestion level, with regard to the network-portion and/or the network segment(s) and/or the network route that connects between an end-point (or a UE, or an end-user device) and the monitoring network element; including the measurement of directional or uni-directional or single-direction network congestion (e.g., uplink or upstream network congestion state or level, and separately, downlink or downstream network congestion state or level); for example, by monitoring and analyzing the average latency values (and particularly, by analyzing separately the average uni-directional latency values), as well as their increase (or decrease, or change) relative to a Baseline uni-directional latency value that is measured in that network during a state that is known to be a steady state or a non-congested state.

In some embodiments, the method and system may operate while being agnostic to (and not dependent on) the particular type of communication network, and/or while being agnostic to (and not dependent on) the particular carrier or service provider and its particular network technology or network topology, and/or while being agnostic to (and not dependent on) the particular end-user device or UE or its type (e.g., laptop computer, desktop computer, smartphone, tablet, smart-watch, Internet-connected television, or the like); and in some embodiments, without requiring to install a particular application or "app" or service on the end-user device or on the UE, and/or without requiring the end-user device or UE to visit a particular website or a particular online destination, and/or in complete transparency to the user of the end-user device who may continue to utilize its UE in a regular way without interruptions and without requiring the user to perform particular tasks on his side. In some embodiments, the method and system may be utilized or deployed with regard to any suitable network element or network node, particular a network element having a fixed operational capacity or fixed operational constraint; and may measure and provide relevant KPI parameter values for monitoring the QoE and for improving or increasing the QoE.

Reference is made to FIG. 1, which is a schematic block diagram illustration of a system 100, in accordance with some demonstrative embodiments. One or more end-user devices are part of a Cellular Access Network 110; for example, a device 101 (e.g., a smartphone) and a device 102 (e.g., a tablet) may communicate over cellular communication links with a Cellular Node/Base Station 111. Similarly, one or more end-user devices are part of a Wireless (e.g., non-cellular) Access Network, such as a Wi-Fi Access Network 113; for example, a device 103 (e.g., a desktop computer) and a device 104 (e.g., a laptop computer) may communicate over Wi-Fi communication links with a Wi-Fi Access Point (AP) 112, or other suitable Wi-Fi element (e.g., a Wi-Fi router, a Wi-Fi home automation hub, or the like).

Cellular Access Network 110 communicates, via its Cellular Node/Base Station 111, with a Communication Switch 121 of a Core Network 120. Similarly, Wi-Fi Access Network 113 communicates, via its Wi-Fi Access Point (AP) 112, with the same Communication Switch 121 or with a different communication switch of Core Network 120.

Communication Switch 121 routes or transports or relays the data packets and/or control messages to an Internet Gateway 123, which is an entry/exit node for the Internet 125; thereby enabling devices 101-104 to communicate with Internet-hosted entities or to consume Internet-based services or content, such as, from a Server 127 (e.g., a Web server, an applications server, a cloud-computing server, or the like). Optionally, a first device (e.g., device 101) may communicate via the Internet 125 with another device (e.g., device 104), such as, conducting a video conference between them, or streaming live video from one to the other, or the like.

In accordance with some embodiments, a Monitoring and Analysis Unit 130 is introduced to Core Network 120; for example, in a communication segment or at a network node that is located between the Communication Switch 121 and the Internet Gateway 123.

Monitoring and Analysis Unit 130 may comprise a Bi-Directional Latency Estimator 131, configured to measure or estimate or determine the bi-directional latency (or the overall latency, or the roundtrip latency) between a device (e.g., device 101, or server 127) the Monitoring and Analysis Unit 130.

Monitoring and Analysis Unit 130 may further comprise a Uni-Directional Uplink Latency Estimator 136 (or a Uni-Directional Upstream Latency Estimator), configured to measure or estimate or determine, separately, only the Uplink (or upstream) Latency of data or packets, only in the direction from a device (e.g., device 101) to Monitoring and Analysis Unit 130.

Monitoring and Analysis Unit 130 may further comprise a Uni-Directional Downlink Latency Estimator 137 (or a Uni-Directional Downstream Latency Estimator), configured to measure or estimate or determine, separately, only the Downlink (or downstream) Latency of data or packets, only in the direction from Monitoring and Analysis Unit 130 to a device (e.g., device 101).

Monitoring and Analysis Unit 130 may operate by analyzing TCP headers and/or TCP timestamps and/or TCP options, via a TCP Header and Timestamp Analyzer 151; and particularly by analyzing the TCP timestamp field "TSval" and by analyzing its behavior and/or characteristics and/or changes, via a TSval Analyzer 152. It is noted that some embodiments may similarly operate in conjunction with timestamped packets that are not necessarily TCP packets, and/or that have a timestamp embedded or included in other suitable field or record or packet-portion (e.g., not necessarily in the packet header).

The Applicants have realized that TCP is a symmetric protocol, allowing data to be sent at any time in either direction; and thus timestamp echoing may occur in either direction; it may be regarded that timestamps may always be sent and echoed in both directions; and the timestamp and timestamp reply fields may be combined into a single "TCP Timestamps Option"; whereas the TSval field indicates the current value of the timestamp clock of the TCP sending the Option".

The Applicants have also realized that Timestamps Option (TSopt) may be sent in an initial <SYN> segment (namely, a segment containing a SYN bit and not containing an ACK bit); and a TSopt may be sent in <SYN, ACK> only a TSopt was received in the initial <SYN> segment for the connection. Once a TSopt has been successfully negotiated, such that both <SYN> and <SYN, ACK> contain TSopt, the TSopt must be sent in every non-<RST> segment for the duration of the connection.

The Applicants have also realized that the utilization of TSopt becomes more common or more frequent as the communication bitrate(s) increase and/or as regular or normal TCP sequence number based ACKSs (acknowledgments) become limited due to their wrap around (e.g., 32 bit which is equivalent to approximately 34 seconds in a One Gigabit-per-second communication link). Accordingly, some embodiments may utilize this particular property of TSval, and the fact that the TSval is present in every TCP packet sent by the origin node, for determining or estimating the uni-directional latency of the packet between (i) the node sending the TSval or the TSopt, to (ii) the node measuring the uni-directional latency value.

Figure 2:
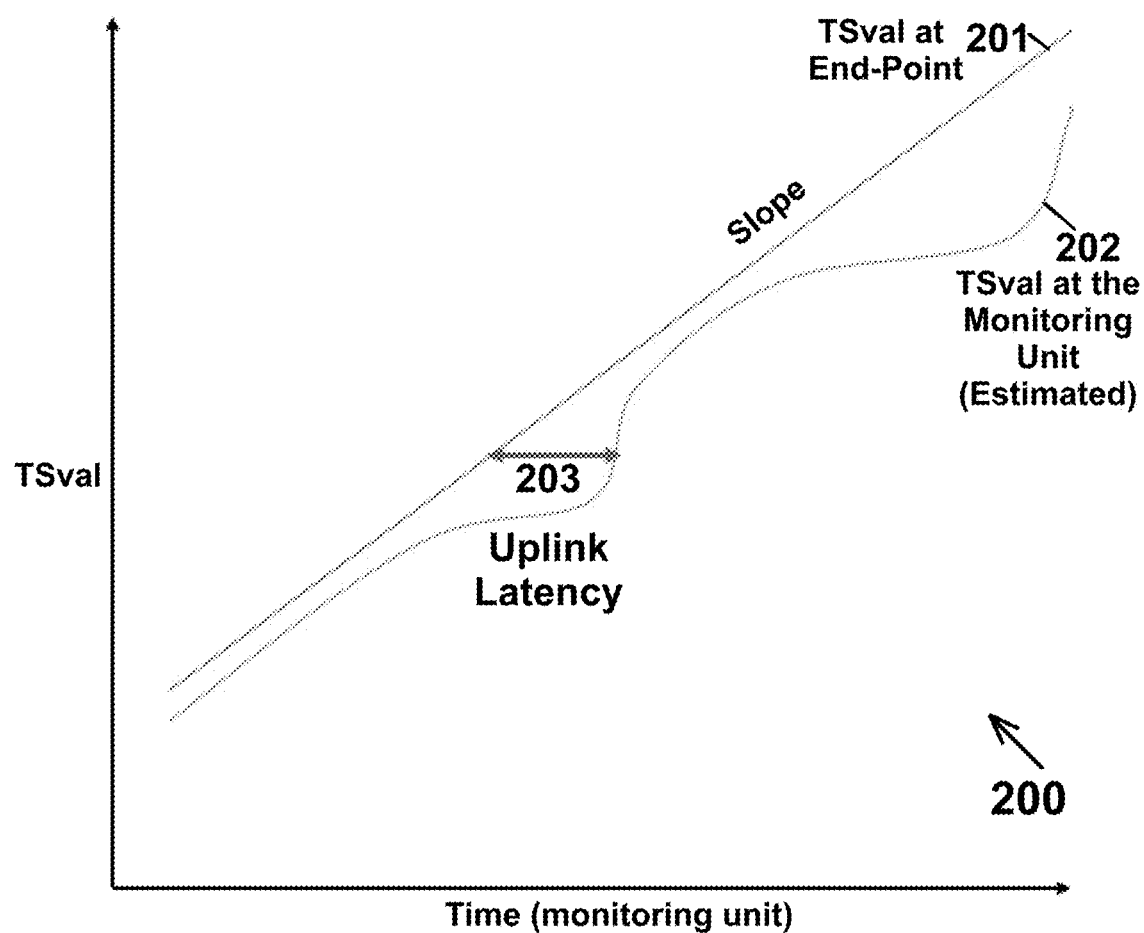
FIG. 2 is a schematic illustration of a graph chart, demonstrating a relationship between (i) a value of a TSval parameter, and (ii) time, in accordance with some demonstrative embodiments.

Reference is made to FIG. 2, which is a schematic illustration of a graph chart 200, demonstrating a relationship between (i) a value of the TSval parameter, and (ii) time, in accordance with some demonstrative embodiments. The vertical axis indicates the value of the TSval parameter. The horizontal axis indicates time (e.g., as monitored or tracked at the Monitoring and Analysis Unit 130). A diagonal line 201 (which has a fixed slope) indicates the value of the TSval parameter at the end-point device (e.g., at device 101), such as the end-point device which is the origin of the packet that was sent upstream. A non-linear, curved, line 202 is located below and to the right, relative to the diagonal line 201; and it indicates the value of the TSval parameter as measured at the monitoring element (e.g., at Monitoring and Analysis Unit 130). A small horizontal line 203 indicates the horizontal distance, which is the time-difference or the time-gap, between (i) each point of the diagonal line 201 (the TSval parameter at the origin device) and (ii) each corresponding point (at the same vertical height) of the curved line 202 (the TSval parameter at the monitoring unit).

As demonstrated in chart 200, the value of the TSval parameter maintains a linear relationship with time, as a diagonal line with having a constant slope. The uni-directional latency in the network, between the end-point and the monitoring unit, can be measured or estimated based on this linear relationship.

In a demonstrative example, TSval values and/or changes and/or behavior over time, were monitored and analyzed across multiple devices that utilize different Operating Systems. The following table, denoted Table 1, summarizes demonstrative results:

TABLE 1

| Device | Slope Behavior | Bias | Slope |
| --- | --- | --- | --- |
| Device 1 (Android) | Constant | Constant | 0.3 |
| Device 2 (Android) | Constant | Constant | 0.1 |
| Device 3 (Android) | Constant | Per Connection | 1 |
| Device 4 (iOS) | Constant | Per Connection | 1 |
| Device 5 (Windows) | Constant | Constant | 1 |

The Applicants have realized that on all devices, for a given TCP connection, the relationship between the TSval value and Time maintains a constant, positive, slope. Additionally, realized the Applicants, on many of the devices, the relationship between the TSval value and Time may be used as a property of the end-point device, while remaining agnostic to (or non-dependent on) the individual TCP connection; such that for some devices (devices 1 and 2 and 5 in this Table), all connections of the same device share the same slope and the same bias. For example, realized the Applicants, the TSval may be expressed as a line or as a linear graph (e.g., line 201 in FIG. 2), wherein TSval= (Time×Slope)+Bias. Furthermore, realized the Applicants, on some devices, the TSval value is associated with a different start value or offset value for each connection; but still maintains the same constant slope for all connections of that device, thus being a property of the UE.

Turning to the behavior of the uni-directional latency, such as the Uplink Latency between the end-point device (as the origin point) and the monitoring unit, such latency may vary at different points of time. In accordance with some embodiments, a Baseline Latency Determination Unit 153 of the system may define and utilize a Baseline Value for a steady state or a non-congested state (e.g., a state that is known to have non-latent or non-delayed real-time communications); the Baseline Value is located along the small horizontal line 203, and remains in a narrow range during normal operating periods or non-congested operating periods. However, such latency may show an increase, and horizontal line 203 becomes wider (horizontally longer), under network congestion conditions.

Figure 3:
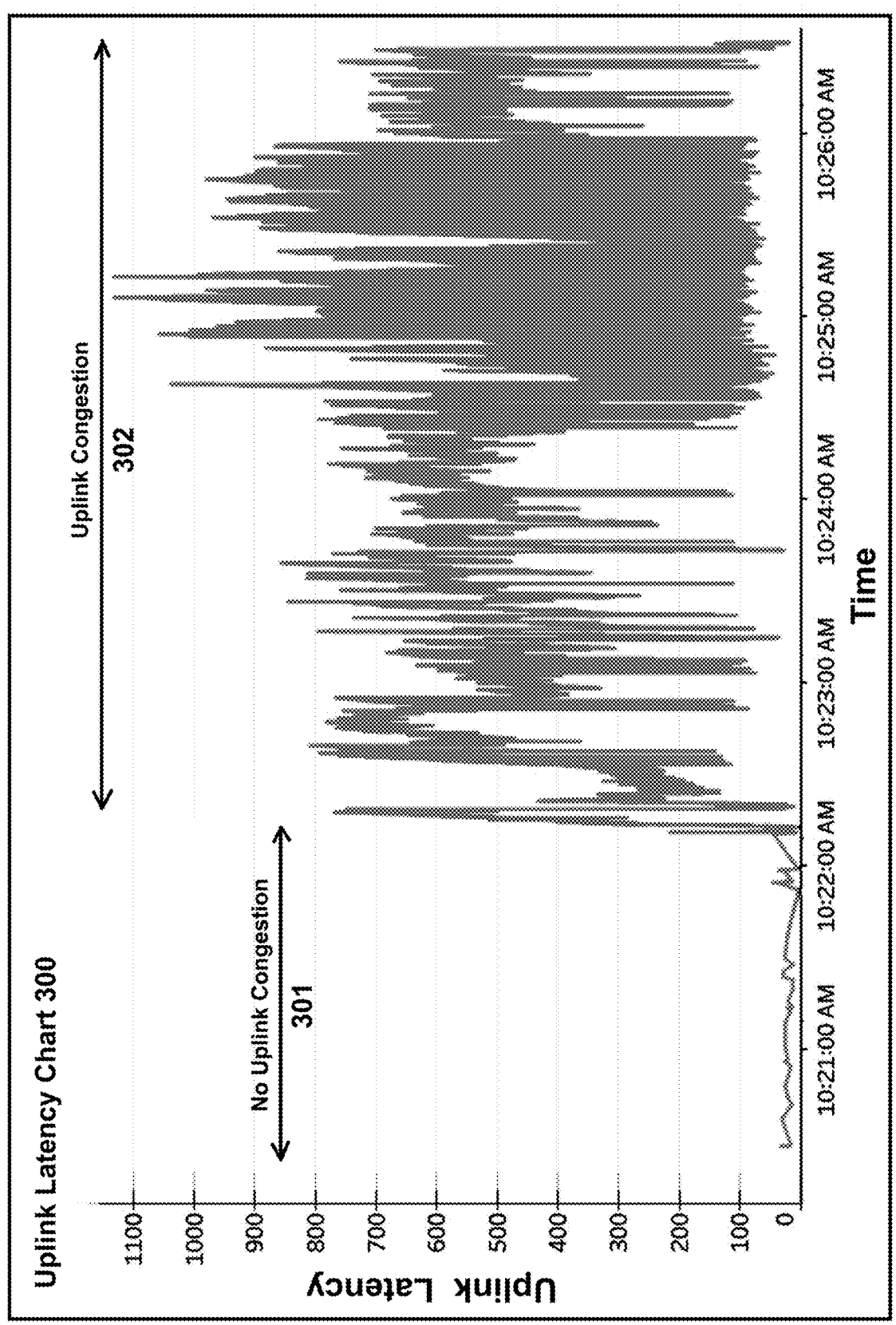
FIG. 3 is a schematic illustration of a graph chart, demonstrating Uplink Latency at two time periods, in accordance with some demonstrative embodiments.

Reference is made to FIG. 3, which is a schematic illustration of a graph chart 300, demonstrating Uplink Latency at two time periods, in accordance with some demonstrative embodiments. The vertical axis indicates the Uplink Latency (for example, in milliseconds). The horizontal axis indicates the time; for example, demonstrating approximately six minutes (e.g., from about 10:20:30 AM, to about 10:26:30 AM). An arrow 301 indicates that the Uplink Latency is low during the first two minutes, during which there was no network congestion. Conversely, an arrow 302 indicates that the Uplink Latency is high during the next four minutes, during which there was network congestion. Accordingly, chart 301 demonstrates how the Uplink Latency, from the end-point device to the monitoring unit, varies significantly during different congestion states of the communication network.

In accordance with some embodiments, the value of the TSval parameter at the end-point device, may be determined or derived at any given time by the Monitoring and Analysis Unit 130; for example, using the following equation denoted Equation (1):

$$TSval(t)=TSval(0)+Slope*dT \quad \text{Equation (1)}$$

In Equation (1), for example:

TSval(t) indicates the value of TSval at time-point t.

TSval(0) indicates the "bias", the value of TSval at time-point 0, as determined by an Initial TSval [TSval(0)] Determination Unit 155.

Slope is a Constant (e.g., per device, or per TCP connection).

dT is the time-difference from time-points 0 to t, namely: Time(t)—Time(0).

At the Monitoring and Analysis Unit 130, the relationship between the passing Time and the value of TSval may be determined or estimated using a suitable method; for example, using Equation (2A):

$$Time(t)=1/Slope*TSval(t)+Offset(t) \quad \text{Equation (2A)}$$

Wherein:

$$Offset(t)=\text{Baseline Latency}+\text{Additional Latency}(t) \quad \text{Equation (2B)}$$

In Equations (2A) and (2B), the Offset value is variable and changes over time; it is the sum of (i) a Baseline Latency value (e.g., determined or measured during steady network state or non-congested network state), and (ii) the Additional Latency that is introduced at the particular time-point (t) due to the current, momentary, congestion state of the network.

For example, the Baseline Latency may be determined or derived from a Minimum value of Round Trip Time (RTT) values, measured between the end-point device and the Monitoring and Analysis Unit 130, wherein the RTT value is the time duration that it takes for a packet to traverse the network from the Monitoring and Analysis Unit 130 to the end-point device and back again to the Monitoring and Analysis Unit 130; for example, by selecting the Minimum RTT value that was observed within M minutes or within H hours, wherein M or H are pre-defined values; or, in other embodiments, the value of the Baseline Latency may be hard-coded or pre-configured in the system or in the Monitoring and Analysis Unit 130, or may be calculated or determined by other methods and provided to the Monitoring and Analysis Unit 130. It is noted that one or more suitable methods may be used, by the Monitoring and Analysis Unit 130, in order to measure the RTT value; for example, based on TCP sequence number and ACK number, or based on the delay between the first SYN and ACK packets that are sent out, or by performing a "ping" check (e.g., by sending an Internet Control Message Protocol (ICMP) echo request message, and receiving an ICMP echo reply message), and/or by other methods of performing "server-side RTT" measurement (e.g., the RTT is measured by the Monitoring and Analysis Unit 130, and not by the end-point device).

In some embodiments, the value of the Offset may be determined or calculated using a Slope/Offset Determination Unit 154, using a suitable method; for example, via a method that firstly estimates or determines the value of the Slope, using Equation (3):

$$\text{Slope}=(TSval(t)-TSval(0))/(Time(t)-Time(0)) \quad \text{Equation (3)}$$

In some embodiments, to ensure or to increase the accuracy of the Slope estimation, the Offset should be close to the Baseline Latency value; such that the Additional Latency should be low at the time-point in which the estimation is performed. In order to achieve this, for example, the method may utilize a time-point at which the RTT delay is low or is the lowest or is at a minimum, or is smaller than a pre-defined threshold value; and since the RTT duration is the upper limit of the uni-directional latency, the RTT duration also sets a maximum value or an upper cap to the Offset value.

Furthermore, to ensure or to increase the accuracy of the Slope estimation, a short period of Slope stabilization time may be used from the reference point of TSval (which is TSval(0) in the above equations), before actually calculating (and utilizing) the value of Slope. Additionally, in some embodiments, Slope measurements may be performed or repeated at multiple time-points, and then may be averaged; such that the average Slope value is utilized, instead of utilizing a single value measured at a single time-point.

Once the Slope for a particular connection is determined, the Offset value may be determined or calculated, for example, via Equation (4); and the Offset value corresponds to the uni-directional latency (e.g., the uplink latency from the endpoint to the Monitoring and Analysis Unit 130). The Slope may be calculated using the current value and a reference value of the TSval parameter and of the Time parameter, for this particular connection. In some embodiments, the reference values of TSval and Time parameters, of a particular connection may be updated periodically (e.g., once per day), to mitigate or to prevent inaccuracies in the latency estimation due to a possible clock skew.

$$\text{Latency}(t)=Time(t)-[1/\text{Slope}*TSval(t)]+\text{Baseline Latency} \quad \text{Equation (4)}$$

Figure 4:
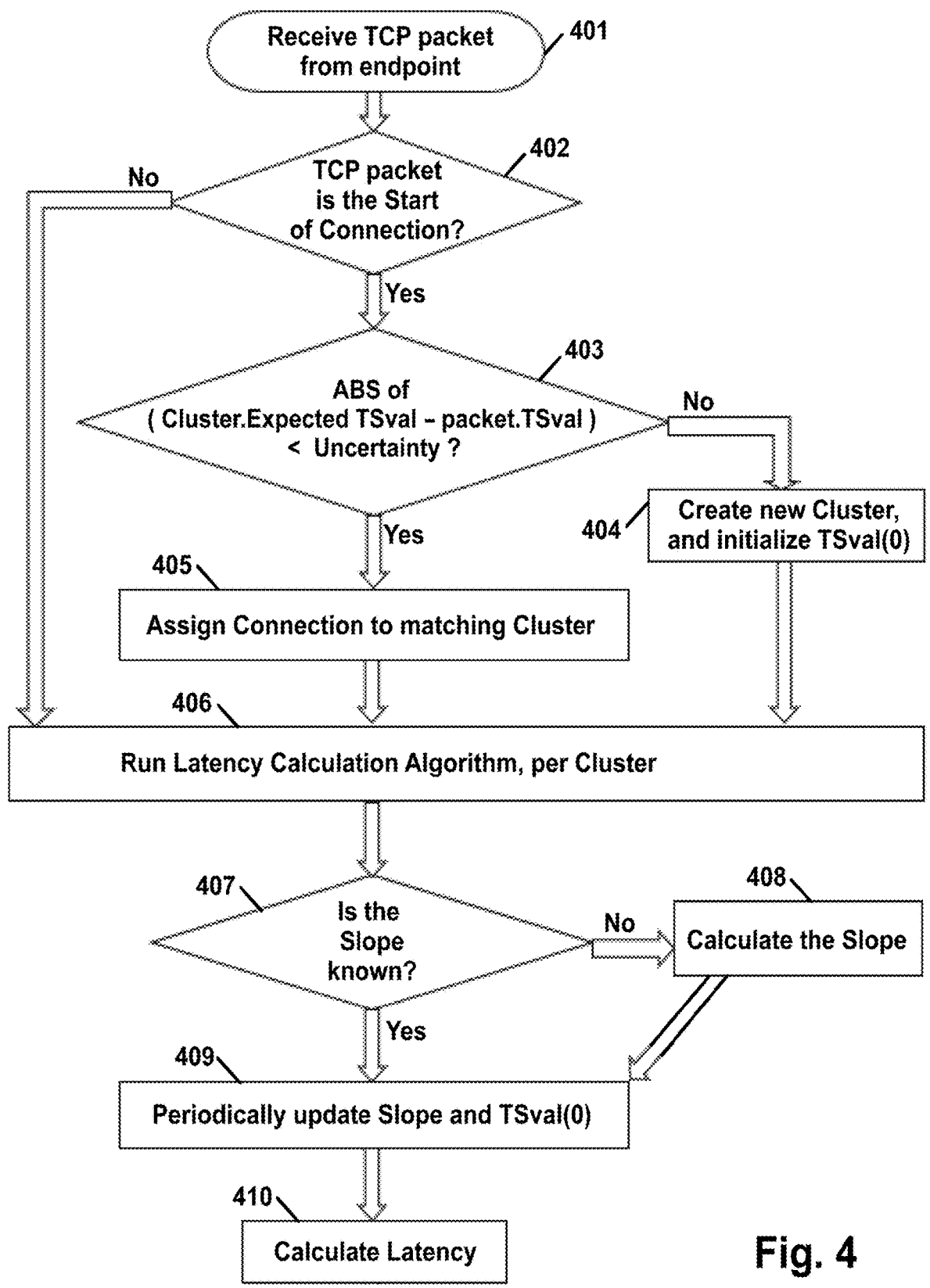
FIG. 4 is a flow-chart of a method of estimating latency between an end-point and a Monitoring and Analysis Unit, in accordance with some demonstrative embodiments.

Reference is made to FIG. 4, which is a flow-chart of a method of estimating latency between an end-point and the Monitoring and Analysis Unit 130, in accordance with some demonstrative embodiments. The end-point may be the end-user device (client device, UE device, end-user device); or, in other scenarios, the end-point may be a server (e.g., a Web server, an application server, an enterprise server, a cloud-computing server). In some embodiments, the method may be invoked for all TCP packets having a TSval value; or, in other embodiments, for some (and not all) such TCP packets (e.g., every 2nd packet, every 3rd packet, every Nth packet). The method utilizes the Baseline RTT value; and RTT measurement is available for the method to invoke.

In some embodiments, particularly if Network Address Translation (NAT) is used, different endpoints (e.g., different endpoint devices) would typically have different TSval values; and there may be a very low probability of two devices having the same TSval value. For example, with a fast TSval tick time of 1 millisecond, and using a TSval value having 32 bits, and using a time uncertainty threshold of 2 seconds, the probability of having two connections having the same TSval value is 2×1,000/(2^32), which is approximately 0.0000005, corresponding to a very low probability for a collision; and with 1,000 connections being analyzed in parallel, the collision probability is still low. Even with such low probability of collision, some embodiments may still ensure collision-free operation, by detecting and utilizing separate Clusters of data-points created based on the TSval values, and running the latency calculation algorithm on each cluster separately.

For example, the method may begin by receiving a TCP packet from an endpoint (block 401), such as, at the Monitoring and Analysis Unit 130. The method then checks (block 402) whether or not the received TCP packet is the start of a new connection (namely, a connection that is not already being monitored and analyzed).

If the checking result of block 402 is positive (arrow "Yes"), then the method proceeds to block 403. Conversely, if the checking result of block 402 is negative (arrow "No"), then the method proceeds to block 406.

In block 403, the method calculates the difference between: (i) the TSval value of this particular TCP packet, and (ii) the TSval value of an expected cluster of TSval values to which this TCP packet belongs; and the method checks whether the absolute value (ABS) of this difference is smaller than a pre-defined threshold value of certainty (e.g., 2 seconds, or 3 seconds, or other suitable value). The If the checking result of block 403 is negative (arrow "No"), then the method proceeds to block 404, in which the method creates a new Cluster and initializes the value of TSval(0); and then the methods proceeds to block 406.

Conversely, if the checking result of block 403 is positive (arrow "Yes"), then the method proceeds to block 405, in which the method assigns a Connection to a particular matching Cluster; and then the method proceeds to block 406. In some embodiments, the cluster-related operations of the method (e.g., block 404, block 405) may be performed by a Cluster Creator/Updater Unit 156.

In block 406, the method runs the latency calculation algorithm, per Cluster.

Some embodiments utilize Clusters in order to accommodate scenarios where there may be a plurality of different devices that are located behind an actual endpoint (e.g., due to tethering, or Network Address Translation (NAT) service) and thus share the same Internet Protocol (IP) address. For example, each tethered device, or each device located behind the NAT service, may have its own TCP timestamp slope value and its own bias value; but due to the tethering or NAT service, those values of such different devices appear to be associated with the same IP address. Therefore, some embodiments recognize and create or group data-points into Clusters, to map each TCP connection to the appropriate Cluster before running the algorithm, in order to distinguish among multiple end-user devices that share the same IP address or that are behind the same single endpoint.

Demonstrating the above-mentioned operations: for example, upon arrival of a new TCP packet having a TSval value, the method searches for an already-existing cluster handler that already has (or that already covers) this particular TSval value, up to a pre-defined margin-of-error or margin-of-difference (e.g., 2 or 3 or 4 or 5 seconds; or, in the range of 2,000 to 5,000 ticks). If such an existing cluster is found, then the currently-handled TCP packet is added to this cluster, and the above-mentioned algorithm (for determining the Slope, the Offset, and thus the Uni-Directional Latency) is performed based on this cluster. In contrast, if no existing cluster with relevant TSval value is found, then a new cluster is created or opened for the TSval value of this packet, and the relevant data (e.g., the packet timestamp and the TSval value) are placed in this new cluster.

In block 407, the method checks whether the Slope is already known, for this particular Connection. If not, then the method calculates the Slope (block 408), for example, based on the above-mentioned Equations.

As indicated in block 409, the method periodically updates the values of the Slope and of TSval(0); for example, once per hour, or once per day. Such updating operations may be performed by a Parameters Updater Unit 157.

As indicated in block 410, the method calculates the latency; for example, based on the above-mentioned Equations, and using a Uni-Directional Latency Determination Unit 158.

In some embodiments, the operations of blocks 406 through 410 correspond, together, to the core algorithm. Block 406 indicates the start of the core algorithm, and performs initialization of the parameters, namely, setting the initial TSval and the initial Time data-points (e.g., setting TSval (0), and setting Time(0)), where are then used for calculating the slope and bias. In block 409, the values of TSval(0) and Time(0) are updated (e.g., periodically, every M minutes, or every H hours), relative to their initial values, to improve accuracy and/or to accommodate (or to compensate for) clock skew of some devices.

Some embodiments may further be used to separately measure or to separately determine a latency on each side of the Monitoring and Analysis Unit 130; namely, the latency on the client side or the end-user device side, which is the latency between the Monitoring and Analysis Unit 130 and the end-user device or the client-device (e.g., device 101); and separately, the latency on the server side or on the Internet side, which is the latency between the Monitoring and Analysis Unit 130 and a web server or application server (e.g., server 127); thereby providing a way to measure or determine an estimate a Segment-Related Latency, that pertains to only a particular segment of the communication route between the client device and the server.

For example, when the algorithm is run on TSval values from the end-user device (e.g., the TSval values of TCP packets received at the Monitoring and Analysis Unit 130 from device 101), it enables the Monitoring and Analysis Unit 130 to estimate the Uplink Latency for the relevant access network (namely, the latency for a packet to traverse from end-user device 101 to the Monitoring and Analysis Unit 130). Conversely, when the algorithm is run on TSval values from the server (e.g., the TSval values of TCP packets received at the Monitoring and Analysis Unit 130 from server 127), it enables the Monitoring and Analysis Unit 130 to estimate the Downlink Latency for the Internet-side segment of the communication route (namely, the latency for a packet to traverse from server 127 to the Monitoring and Analysis Unit 130).

For example, Monitoring and Analysis Unit 130 may comprise an RTT Measurement Unit or a Bi-Directional Latency Measurement Unit 131, configured to measure RTT or the bi-directional latency between the Monitoring and Analysis Unit 130 and a particular end-point (e.g., an end-user device, or an Internet server). Optionally, the Bi-Directional Latency Measurement Unit 131 may comprise, or may be implemented as, two sub-units: (a) an Internal Latency Estimator Unit 132, configured to measure or estimate the latency between the Monitoring and Analysis Unit 130 and the end-user device 101, which may be called "Internal Latency" or "Access-Network-Side Latency" or "Client-Side Latency"; and (b) an External Bi-Directional Latency Estimator Unit 133, configured to measure or estimate the bi-directional latency between the Monitoring and Analysis Unit 130 and the Internet server such as Server 127, which may be called "External bi-directional latency" or "Internet-Side bi-directional latency" or "Internet-Server-Side bi-directional latency".

In some embodiments, the above-mentioned units (131, 132 and/or 133), may comprise, or may be implemented as, suitable sub-units or components; for example, as the following four sub-units or components:

(I) An Access-Network-Side Uplink Latency Estimator 141, configured to estimate or measure the latency for packets that are transported from the end-user device or the client device (e.g., device 101) to the Monitoring and Analysis Unit 130; which may be called the Access-Network-Side Uplink Latency; and which indicates the uplink latency in the communication segment that is between device 101 and Monitoring and Analysis Unit 130, and in the specific direction from device 101 (as originating node) to Monitoring and Analysis Unit 130 (as receiving node). The Access-Network-Side Uplink Latency may be measured or estimated or determined, for example, by applying the method of FIG. 4 as well as the above-mentioned Equations (1) through (4), to TCP packets that are received at the Monitoring and Analysis Unit 130 from device 101.

(II) An Access-Network-Side Downlink Latency Estimator 142, configured to estimate or measure the latency for packets that are transported to the end-user device or the client device (e.g., device 101) from the Monitoring and Analysis Unit 130; which may be called the Access-Network-Side Downlink Latency; and which indicates the downlink latency in the communication segment that is between Monitoring and Analysis Unit 130 and device 101, and in the specific direction from Monitoring and Analysis Unit 130 (as originating node) to device 101 (as receiving node). The Access-Network-Side Downlink Latency may be measured or estimated by measuring the Internal bi-directional latency value; and then, subtracting from it the value of the Access-Network-Side Uplink Latency that was measured or estimated by the Access-Network-Side Uplink Latency Estimator 141. The Access-Network-Side Downlink Latency can be measured for a particular packet, if RTT measurement or bi-directional latency measurement is available with regard to this particular packet, and if the Access-Network-Side Uplink Latency has been estimated for this particular packet.

(III) An Internet-Side Downlink Latency Estimator 144, configured to estimate or measure the latency for packets that are transported from Internet server 127 to Monitoring and Analysis Unit 130; which may be called the Internet-Side Downlink Latency; and which indicates the downlink latency in the communication segment that is between Internet server 127 and Monitoring and Analysis Unit 130, and in the specific direction from Internet server 127 (as originating node) to Monitoring and Analysis Unit 130 (as receiving node). The Internet-Side Downlink Latency may be measured or estimated or determined, for example, by applying the method of FIG. 4 as well as the above-mentioned Equations (1) through (4), to TCP packets that are received at the Monitoring and Analysis Unit 130 from server 127.

(IV) An Internet-Side Uplink Latency Estimator 143, configured to estimate or measure the latency for packets that are transported from Monitoring and Analysis Unit 130 to Internet server 127; which may be called the Internet-Side Uplink Latency; and which indicates the uplink latency in the communication segment that is between Monitoring and Analysis Unit 130 and Internet server 127, and in the specific direction from Monitoring and Analysis Unit 130 (as originating node) to Internet server 127 (as receiving node). The Internet-Side Uplink Latency may be measured or estimated by measuring the External bi-directional latency value; and then, subtracting from it the value of the Internet-Side Downlink Latency that was measured or estimated by the Internet-Side Downlink Latency Estimator 144. The Internet-Side Uplink Latency can be measured for a particular packet, if bi-directional latency measurement is available with regard to this particular packet, and if the Internet-Side Downlink Latency has been estimated for this particular packet.

Some embodiments may operate accurately, particularly in a system where TCP is the dominant protocol that is running on top of Internet Protocol (IP) suite for ensuring reliable transmission of packets in IP networks. Some embodiments may operate accurately when measurements are run in an IP network with a significant proportion of the end-point traffic running on TCP. Additionally or alternatively, some embodiments may operate accurately in conjunction with non-TCP packets, for example, if the timestamps from the end-point devices are available in the packets or as part of the packets or as part of packet headers; such as, under a different protocol (e.g., non-TCP), or under a modified version or an extended version that is similar to TCP and provides a timestamp of a packet as part of the packet itself or as part of the packet header or other packet portion.

Some embodiments provide a method and a system for estimating or measuring uni-directional latency between an end-point (e.g., device 101, or server 127) and the monitoring element (e.g., Monitoring and Analysis Unit 130), in real-time or in near-real-time; thereby providing a unique capability to dynamically determine or detect the current, real-time, congestion state of the communication network, directionally, in a specific direction (in the uplink direction; or in the downlink direction; or in both directions but with separate values for uplink latency and for downlink latency). Some embodiments may achieve this without requiring any configuration or modification of any endpoint (e.g., without modification or configuration of device 101 and/or server 127), and/or without installing any particular application or module on any endpoint (e.g., device 101, server 127), and/or with complete transparency relative to the endpoint (e.g., without device 101 and/or server 127 even knowing that the uni-directional latency is determined by the Monitoring and Analysis Unit 130).

Some embodiments are thus different from a conventional system, which (at most) attempts to measure bi-directional overall RTT, without attempting to separately measure or separately estimate the uplink latency or the downlink latency.

In some embodiments, a Congestion Mitigation Unit 161 may operate to select and/or perform and/or trigger and/or activate one or more pre-defined congestion mitigation operations, in response to a determination by the Congestion Mitigation Unit 161 that one or more rules or conditions hold true. Such rules or conditions may be, or may include, for example: (i) detecting that the Access-Network-Side Uplink Latency is greater than a pre-defined threshold value; and/or (ii) detecting that the Access-Network-Side Downlink Latency is greater than a pre-defined threshold value; and/or (iii) detecting that the Internet-Side Uplink Latency is greater than a pre-defined threshold value; and/or detecting that the Internet-Side downlink Latency is greater than a pre-defined threshold value.

Some relevant operations, and particularly congestion mitigation operations, which may be triggered or activated, may include, for example: turning-on or activating or deploying one or more additional network elements or network components (e.g., router, switch, load balancer); modifying a current configuration of a particular network element; modifying a filtering constraint or a bandwidth constraint of a particular network element; de-activating or turning off or temporarily pausing a particular network element (e.g., pausing or stopping a rate-limiting unit or filter; stopping or pausing a bandwidth-limiting unit or filter); de-activating or turning off or temporarily pausing a particular inline service or other traffic-related service or traffic-handling service (e.g., estimating that a particular uni-directional latency is caused due to a Malware/Anti-Virus filtering service or a Parental Control service, and pausing or stopping such service with regard to a particular connection or device); and/or other suitable congestions mitigation operations.

In some embodiments, optionally, a Deep Packet Inspection (DPI) Engine 139 or a DPI analysis unit may perform DPI on monitored packets, and may determine an application or a server-side application or a client-side application that is associated with a packet (or with a group of packets, or with a communication flow, or with a message); or may determine a type-of-application or an application-type (e.g., video conferencing; video streaming; voice call; gaming; or the like) that is associated with a packet (or with a group of packets, or with a communication flow, or with a message). The DPI analysis results may be fused or combined with the uni-directional latency data that is generated by the Monitoring and Analysis Unit 130, to generate, for example: (i) uni-directional latency data with regard to a communication flow that is associated with a particular application; and/or (ii) uni-directional latency data with regard to a communication flow that is associated with a particular server-side application; (iii) uni-directional latency data with regard to a communication flow that is associated with a particular client-side application; and/or (iv) uni-directional latency data with regard to a communication flow that is associated with a particular application-type; (v) (i) uni-directional latency data with regard to a communication flow that is associated with a particular server. Some embodiments may thus detect a particular uni-directional latency problem, that may exist specifically or particularly with regard to a specific application or a specific application-type or a specific server, thereby enabling the system to select and to deploy particular mitigation operations that address the particular problem that was detected.

In some embodiments, optionally, the measurement of uni-directional latency may be utilized by the system to determine or to estimate, whether a particular endpoint (e.g., device 101) is subject to a Network Address Translation (NAT) service, namely, a service or a network element that performs mapping of a first IP address space into another IP address space (e.g., translating among private and public IP addresses) by modifying network address information that are in IP headers of packets while they are in transit; and similarly, some embodiments may be able to determine, remotely, at the Monitoring and Analysis Unit 130, that a particular endpoint, which has a single IP address, is actually a network-facing endpoint that serves at least one additional device behind it or that serves at least two additional devices behind it, such as via tethering or via NAT service. Furthermore, some embodiments may enable to distinguish between two different endpoints or devices, that are located behind a NAT service, based on the different Slope value that is calculated for each one of them. For example, the Monitoring and Analysis Unit 130 may detect that analysis of monitored timestamps of packets that are associated with a single particular endpoint having a single particular IP address, clearly show N separate clusters (e.g., 2 or 3 or 5 separate clusters) of data-points that correspond to Slope and Bias (of Offset) of the TSval linear graph; thereby enabling the Monitoring and Analysis Unit 130 to generate a determination that there are actually a total of N devices or N end-user devices (and not just a single device) that are sharing or using the same single endpoint or same single IP address. This insight may be utilized by the system for other purposes; for example, to generate a notification to a system administrator, or to modify a billing scheme for this endpoint (e.g., some endpoints may not be allowed to perform tethering unless they pay an additional charged), or to trigger other operations which may be derived from such insight.

Some embodiments include a system comprising: a Uni-Directional Latency Determination Unit, connected in a communication network, located between an end-user device and a server; configured to monitor packets transported between the end-user device and the server, and to estimate a uni-directional latency of packet transport from the end-user device to the server or from the server to the end-user device.

In some embodiments, the Uni-Directional Latency Determination Unit comprises: a Transmission Control Protocol (TCP) Header and Timestamp Analyzer, to perform an analysis of data contained in timestamps of TCP packet headers of packets transported from the end-user device to the server, and to determine said uni-directional latency from said analysis.

In some embodiments, the TCP Header and Timestamp Analyzer comprises: a TSval Field Analyzer, to perform a specific analysis of data in a TSval field of TCP packets that are transported from the end-user device to the server, and to determine said uni-directional latency from said specific analysis of the TSval field.

In some embodiments, the TSval Field Analyzer is associated with a Baseline Latency Determination Unit, which is configured to determine a Baseline Uni-Directional Latency Value that characterizes a non-congested network state of said communication network; wherein the TSval Field Analyzer is configured to determine a momentary Additional Latency, and to add said momentary Additional Latency to said Baseline Uni-Directional Latency Value, to determine said uni-directional latency.

In some embodiments, the TSval Field Analyzer determines the momentary Additional Latency based on an estimated distance between: (i) a linear graph of TSval values that are contained in TCP packet headers arriving from said end-user device, and (ii) a curved non-linear graph of estimated TSval values that are estimated at said Uni-Directional Latency Determination Unit.

In some embodiments, the TSval Field Analyzer determines a Slope property of said linear graph, and determines a Bias property of said linear graph, based on analysis of TSval values that are contained in TCP packet headers arriving from said end-user device.

In some embodiments, the TSval Field Analyzer operates on a Per Connection basis, and determines properties of said linear graph Per Connection between said end-user device and said server.

In some embodiments, the TSval Field Analyzer utilizes a collision avoidance mechanism to avoid a possible collision between (i) one or more TSval values that belong to a first TCP connection of a first end-user device, and (ii) one or more TSval values that belong to a second TCP connection of a second end-user device.

In some embodiments, the system comprises: a Cluster Creator and Updater Unit, configured to create and update clusters of TSval values, wherein each cluster corresponds to a single TCP connection.

In some embodiments, the system comprises: a Parameters Updater Unit, configured to periodically update the Slope and the Bias of said linear graph, for a particular connection that already has previously-calculated values of said Slope and said Bias.

In some embodiments, the Uni-Directional Latency Determination Unit determines said Uni-Directional Latency by firstly determining and utilizing a Client-Side Internal Round-Trip Time (RTT) value, indicating a first RTT value that corresponds to a time delay of packet transport from the end-user device to said Uni-Directional Latency Determination Unit.

In some embodiments, the Uni-Directional Latency Determination Unit determines said Uni-Directional Latency by firstly determining and utilizing a Server-Side External Round-Trip Time (RTT) value, indicating a second RTT value that corresponds to a time delay of packet transport from the server to said Uni-Directional Latency Determination Unit.

In some embodiments, the Uni-Directional Latency Determination Unit determines said Uni-Directional Latency by utilizing: (i) an Access-Network-Side Uni-Directional Uplink Latency Estimator, configured to estimate the uni-directional latency for packets that are transported from the end-user device to the Uni-Directional Latency Determination Unit; (ii) an Access-Network-Side Uni-Directional Downlink Latency Estimator, configured to estimate the uni-directional latency for packets that are transported from the Uni-Directional Latency Determination Unit to the end-user device.

In some embodiments, the Uni-Directional Latency Determination Unit operates to determine said Uni-Directional Latency, based exclusively on analysis of TSval values in TCP packet headers that are received at said Uni-Directional Latency Determination Unit on their transport way from the end-user device to the server.

In some embodiments, the Uni-Directional Latency Determination Unit operates to determine said Uni-Directional Latency, based exclusively on analysis of TSval values in TCP packet headers that are received at said Uni-Directional Latency Determination Unit on their transport way from the end-user device to the server, without requiring any configuration or modification of the end-user device, and without requiring any configuration or modification of the server, and without sending any query to the end-user device, and without sending any query to the server.

In some embodiments, if the Uni-Directional Latency, as determined by the Uni-Directional Latency Determination Unit, is greater than a pre-defined threshold value, then a Congestion Mitigation Unit is triggered to deploy one or more pre-defined network congestion mitigation operations to reduce network congestion in said communication network.

In some embodiments, the TSval Field Analyzer is further configured to distinguish or to differentiate between a first device and a second device, that are located behind a Network Address Translation (NAT) service, based on detecting two different Slope property values.

In some embodiments, the system comprises: a Deep Packet Inspection (DPI) engine, to perform a DPI analysis of packets exchanged between the end-user device and the server, and to determine that said packets belong to a particular application or application-type; wherein the Uni-Directional Latency Determination Unit is configured to receive outputs from (i) the TSval Field Analyzer, and (ii) from the DPI engine; and to determine a unit-directional latency value per particular application or application-type.

In some embodiments, a method comprises: at a Uni-Directional Latency Determination Unit, that is connected in a communication network, and that is located between an end-user device and a server, monitoring packets transported between the end-user device and the server, and estimating a uni-directional latency of packet transport from the end-user device to the server or from the server to the end-user device; wherein said estimating comprises: performing an analysis of data contained in timestamps of TCP packet headers of packets transported from the end-user device to the server, and determining said uni-directional latency from said analysis; wherein said analysis of data comprises: performing a specific analysis of data in a TSval field of TCP packets that are transported from the end-user device to the server, and determining said uni-directional latency from said specific analysis of the TSval field.

Some embodiments include a system comprising: a Uni-Directional Latency Determination Unit, connected in a communication network, located between an end-user device and a server; configured to monitor packets transported between server and the end-user device, and to estimate a uni-directional latency of packet transport from the server to the end-user device and/or from the end-user device to the server.

In some embodiments, the Uni-Directional Latency Determination Unit comprises: a Transmission Control Protocol (TCP) Header and Timestamp Analyzer, to perform an analysis of data contained in timestamps of TCP packet headers of packets transported from the server to the end-user device, and to determine said uni-directional latency from said analysis.

In some embodiments, the TCP Header and Timestamp Analyzer comprises: a TSval Field Analyzer, to perform a specific analysis of data in a TSval field of TCP packets that are transported from the server to the end-user device, and to determine said uni-directional latency from said specific analysis of the TSval field.

In some embodiments, the TSval Field Analyzer is associated with a Baseline Latency Determination Unit, which is configured to determine a Baseline Uni-Directional Latency Value that characterizes a non-congested network state of said communication network; wherein the TSval Field Analyzer is configured to determine a momentary Additional Latency, and to add said momentary Additional Latency to said Baseline Uni-Directional Latency Value, to determine said uni-directional latency. In some embodiments, the TSval Field Analyzer determines the momentary Additional Latency based on an estimated distance between: (i) a linear graph of TSval values that are contained in TCP packet headers arriving from said server, and (ii) a curved non-linear graph of estimated TSval values that are estimated at said Uni-Directional Latency Determination Unit. In some embodiments, the TSval Field Analyzer determines a Slope property of said linear graph, and determines a Bias property of said linear graph, based on analysis of TSval values that are contained in TCP packet headers arriving from said server.

In some embodiments, the TSval Field Analyzer operates on a Per Connection basis, and determines properties of said linear graph Per Connection between said server and said end-user device.

In some embodiments, the TSval Field Analyzer utilizes a collision avoidance mechanism to avoid a possible collision between (i) one or more TSval values that belong to a first TCP connection of a first server, and (ii) one or more TSval values that belong to a second TCP connection of a second server that is located behind (or within) a NAT service and/or a tethered connection.

In some embodiments, the system comprises a Cluster Creator and Updater Unit, configured to create and update clusters of TSval values, wherein each cluster corresponds to a single TCP connection. In some embodiments, a Parameters Updater Unit is configured to periodically update the Slope and the Bias of said linear graph, for a particular connection that already has previously-calculated values of said Slope and said Bias.

In some embodiments, the Uni-Directional Latency Determination Unit determines said Uni-Directional Latency by firstly determining and utilizing a Sever-Side Internal Round-Trip Time (RTT) value, indicating a first RTT value that corresponds to a time delay of packet transport from the server to said Uni-Directional Latency Determination Unit.

In some embodiments, the Uni-Directional Latency Determination Unit determines said Uni-Directional Latency by firstly determining and utilizing a Server-Side External Round-Trip Time (RTT) value, indicating a second RTT value that corresponds to a time delay of packet transport from the end-user device to said Uni-Directional Latency Determination Unit.

In some embodiments, the Uni-Directional Latency Determination Unit determines said Uni-Directional Latency by utilizing: (i) an Internet-Side Uni-Directional Downlink Latency Estimator, configured to estimate the uni-directional latency for packets that are transported from the server to the Uni-Directional Latency Determination Unit; (ii) an Internet-Side Uni-Directional Uplink Latency Estimator, configured to estimate the uni-directional latency for packets that are transported from the Uni-Directional Latency Determination Unit to the server.

In some embodiments, the Uni-Directional Latency Determination Unit operates to determine said Uni-Directional Latency, based exclusively on analysis of TSval values in TCP packet headers that are received at said Uni-Directional Latency Determination Unit on their transport way from the server to the end-user device.

In some embodiments, the Uni-Directional Latency Determination Unit operates to determine said Uni-Directional Latency, based exclusively on analysis of TSval values in TCP packet headers that are received at said Uni-Directional Latency Determination Unit on their transport way from the server to the end-user device; without requiring any configuration or modification of the end-user device, and without requiring any configuration or modification of the server, and without sending any query to the end-user device, and without sending any query to the server.

In some embodiments, if the Uni-Directional Latency, as determined by the Uni-Directional Latency Determination Unit, is greater than a pre-defined threshold value, then a Congestion Mitigation Unit is triggered to deploy one or more pre-defined network congestion mitigation operations to reduce network congestion in said communication network.

In some embodiments, the TSval Field Analyzer is further configured to distinguish between a first server and a second server, that are located behind a Network Address Translation (NAT) service or behind a tethered connection, based on detecting two different Slope property values.

In some embodiments, the system comprises: a Deep Packet Inspection (DPI) engine, to perform a DPI analysis of packets exchanged between the server and the end-user device, and to determine that said packets belong to a particular application or application-type; wherein the Uni-Directional Latency Determination Unit is configured to receive outputs from (i) the TSval Field Analyzer, and (ii) from the DPI engine; and to determine a unit-directional latency value per particular application or application-type. The Application may be a server-side application, or a client-side application, or an application that may run on both a client and a server.

In some embodiments, a method comprises: at a Uni-Directional Latency Determination Unit, that is connected in a communication network, and that is located between an end-user device and a server, monitoring packets transported from the end-user device to the server, and estimating a uni-directional latency of packet transport from the end-user device to the server; wherein said estimating comprises: performing an analysis of data contained in timestamps of TCP packet headers of packets transported from the end-user device to the server, and determining said uni-directional latency from said analysis; wherein said analysis of data comprises: performing a specific analysis of data in a TSval field of TCP packets that are transported from the end-user device to the server, and determining said uni-directional latency from said specific analysis of the TSval field.

In some embodiments, a method comprises: at a Uni-Directional Latency Determination Unit, that is connected in a communication network, and that is located between an end-user device and a server, monitoring packets transported from the server to the end-user device, and estimating a uni-directional latency of packet transport from the server to the end-user device; wherein said estimating comprises: performing an analysis of data contained in timestamps of TCP packet headers of packets transported from the server to the end-user device, and determining said uni-directional latency from said analysis; wherein said analysis of data comprises: performing a specific analysis of data in a TSval field of TCP packets that are transported from the server to the end-user device, and determining said uni-directional latency from said specific analysis of the TSval field.

Some embodiments comprise a non-transitory storage medium having stored thereon instructions that, when executed by one or more hardware processors, cause the one or more hardware processors to perform a method as described above.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments include a system comprising: one or more processors configured to execute code; wherein the one or more processors are operably associated with one or more memory units configured to store code; wherein the one or more processors are configured to perform a method as described above and/or herein.

Any reference above or herein to a parameter, typically indicated by a letter such as M or T or P or the like, or by a letter and a numeral such as T1 or P2 or the like, may relate to a pre-defined or pre-configured parameter or constant or value or threshold value; or to a hard-coded value or constant; or, in some embodiments, to a user-configurable or administrator-configurable or programmer-configurable value or threshold value; or, in some embodiments, to a dynamically-configurable and/or automatically-modified value or threshold value, which may be dynamically modified and/or adjusted by the system automatically or autonomously if one or more pre-defined conditions hold true and/or based on one or more pre-defined threshold value modification rules which are enforced by a Parameters/Threshold Values Modification Unit or other suitable component.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments, may be combined with, or may be utilized in combination with, one or more other functions, operations, components and/or features described herein with reference to one or more other embodiments. Some embodiments may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
a Uni-Directional Latency Determination Unit, connected in a communication network,
located between an end-user device and a server,
configured to monitor packets transported between the end-user device and the server, and to estimate a uni-directional latency of packet transport from the end-user device to the server or from the server to the end-user device;
a TSval Field Analyzer, configured to perform an analysis of data in TSval fields of Transmission Control Protocol (TCP) packets that are transported from the end-user device to the server, by separating each TSval value into a baseline latency component and an additional latency component,
wherein the additional latency component is determined based on estimated distance between: (i) a linear graph of TSval values that are contained in TCP packet headers, and (ii) a curved non-linear graph of estimated TSval values that are estimated at said Uni-Directional Latency Determination Unit.

2. The system of claim 1,
wherein the Uni-Directional Latency Determination Unit comprises:
a Transmission Control Protocol (TCP) Header and Timestamp Analyzer,
to perform an analysis of data contained in timestamps of TCP packet headers of packets transported from the end-user device to the server, and to determine said uni-directional latency from said analysis.

3. The system of claim 1,
wherein the TSval Field Analyzer is associated with a Baseline Latency Determination Unit, which is configured to determine a Baseline Uni-Directional Latency Value that characterizes a non-congested network state of said communication network;
wherein the TSval Field Analyzer is configured to determine an Additional Latency, and to add said Additional Latency to said Baseline Uni-Directional Latency Value, to determine said uni-directional latency.

4. The system of claim 1,
wherein the TSval Field Analyzer determines a Slope property of said linear graph, and determines a Bias property of said linear graph, based on analysis of TSval values that are contained in TCP packet headers arriving from said end-user device.

5. The system of claim 4,
wherein the TSval Field Analyzer operates on a Per Connection basis, and determines properties of said linear graph Per Connection between said end-user device and said server.

6. The system of claim 4,
wherein the TSval Field Analyzer utilizes a collision avoidance mechanism to avoid a possible collision between (i) one or more TSval values that belong to a first TCP connection of a first end-user device, and (ii) one or more TSval values that belong to a second TCP connection of a second end-user device.

7. The system of claim 6,
comprising a Cluster Creator and Updater Unit, configured to create and update clusters of TSval values, wherein each cluster corresponds to a single TCP connection.

8. The system of claim 7,
comprising a Parameters Updater Unit, configured to periodically update the Slope and the Bias of said linear graph, for a particular connection that already has previously-calculated values of said Slope and said Bias.

9. The system of claim 4,
wherein the TSval Field Analyzer is further configured to distinguish between a first device and a second device, that are located behind a Network Address Translation (NAT) service, based on detecting two different Slope property values.

10. The system of claim 1,
wherein the Uni-Directional Latency Determination Unit determines said Uni-Directional Latency by firstly determining and utilizing a Client-Side Internal Round- Trip Time (RTT) value that corresponds to a time delay of packet transport from the end-user device to said Uni-Directional Latency Determination Unit.

11. The system of claim 1,
wherein the Uni-Directional Latency Determination Unit determines said Uni-Directional Latency by firstly determining and utilizing a Server-Side External Round-Trip Time (RTT) value that corresponds to a time delay of packet transport from the server to said Uni-Directional Latency Determination Unit.

12. The system of claim 1,
wherein the Uni-Directional Latency Determination Unit determines said Uni-Directional Latency by utilizing:
(i) an Access-Network-Side Uni-Directional Uplink Latency Estimator, configured to estimate the uni-directional latency for packets that are transported from the end-user device to the Uni-Directional Latency Determination Unit;
(ii) an Access-Network-Side Uni-Directional Downlink Latency Estimator, configured to estimate the uni-directional latency for packets that are transported from the Uni-Directional Latency Determination Unit to the end-user device.

13. The system of claim 1,
wherein the Uni-Directional Latency Determination Unit operates to determine said Uni-Directional Latency, based exclusively on analysis of TSval values in TCP packet headers that are received at said Uni-Directional Latency Determination Unit on their transport way from the end-user device to the server.

14. The system of claim 1,
wherein the Uni-Directional Latency Determination Unit operates to determine said Uni-Directional Latency, based exclusively on analysis of TSval values in TCP packet headers that are received at said Uni-Directional Latency Determination Unit on their transport way from the end-user device to the server,
without requiring any configuration or modification of the end-user device,
and without requiring any configuration or modification of the server, and without sending any query to the end-user device,
and without sending any query to the server.

15. The system of claim 1,
wherein if the Uni-Directional Latency, as determined by the Uni-Directional Latency Determination Unit, is greater than a pre-defined threshold value, then a Congestion Mitigation Unit is triggered to deploy one or more pre-defined network congestion mitigation operations to reduce network congestion in said communication network.

16. The system of claim 1, further comprising:
a Deep Packet Inspection (DPI) engine, to perform a DPI analysis of packets exchanged between the end-user device and the server, and to determine that said packets belong to a particular application or application-type;
wherein the Uni-Directional Latency Determination Unit is configured to receive outputs from (i) the TSval Field Analyzer, and (ii) from the DPI engine; and to determine a uni-directional latency value per particular application or application-type.

17. A method comprising:
at a Uni-Directional Latency Determination Unit,
that is connected in a communication network,
and that is located between an end-user device and a server,
monitoring packets transported between the end-user device and the server, and
estimating a uni-directional latency of packet transport from the end-user device to the server or from the server to the end-user device;
performing an analysis of data in TSval fields of Transmission Control Protocol (TCP) packets that are transported from the end-user device to the server, by separating each TSval value into a baseline latency component and an additional latency component,
wherein the additional latency component is determined based on estimated distance between: (i) a linear graph of TSval values that are contained in TCP packet headers, and (ii) a curved non-linear graph of estimated TSval values that are estimated at said Uni-Directional Latency Determination Unit.

18. A non-transitory storage medium having stored thereon instructions that, when executed by a processor, cause the processor to perform a method comprising:
at a Uni-Directional Latency Determination Unit,
that is connected in a communication network,
and that is located between an end-user device and a server,
monitoring packets transported between the end-user device and the server, and
estimating a uni-directional latency of packet transport from the end-user device to the server or from the server to the end-user device;
performing an analysis of data in TSval fields of Transmission Control Protocol (TCP) packets that are transported from the end-user device to the server, by separating each TSval value into a baseline latency component and an additional latency component,
wherein the additional latency component is determined based on estimated distance between: (i) a linear graph of TSval values that are contained in TCP packet headers, and (ii) a curved non-linear graph of estimated TSval values that are estimated at said Uni-Directional Latency Determination Unit.

* * * * *